Sept. 1, 1964
F. W. PETIT ET AL
3,147,463
TELEMETERING SYSTEM
Filed May 21, 1959
5 Sheets-Sheet 1

INVENTORS
FRANCIS W. PETIT
EMMANUEL P. L. SCHULTZ
BY
Edgar H. Jay

Sept. 1, 1964 F. W. PETIT ETAL 3,147,463

TELEMETERING SYSTEM

Filed May 21, 1959 5 Sheets-Sheet 2

INVENTORS
FRANCIS W. PETIT
EMMANUEL P. L. SCHULTZ
BY Edgar McJay

Sept. 1, 1964 F. W. PETIT ETAL 3,147,463

TELEMETERING SYSTEM

Filed May 21, 1959 5 Sheets-Sheet 3

INVENTORS
FRANCIS W. PETIT
EMMANUEL P. L. SCHULTZ
BY
Edgar N. Jay

INVENTORS
FRANCIS W. PETIT
EMMANUEL P.L. SCHULTZ
BY
Edgar N. Jay

INVENTORS
FRANCIS W. PETIT
EMMANUEL P. L. SCHULTZ
BY
Edgar H. Jay

United States Patent Office 3,147,463 Patented Sept. 1, 1964

3,147,463

TELEMETERING SYSTEM

Francis William Petit, North Woodbury, and Emmanuel Paul Larue Schultz, Canaan, Conn., assignors to The Bristol Company, Waterbury, Conn., a corporation of Connecticut Filed May 21, 1959, Ser. No. 814,832
10 Claims. (Cl. 340—206)

This invention relates to telemetering systems and especially to time-duration impulse telemetering systems utilizing carrier currents superposed on low-voltage power distribution lines.

Telemetering and telecontrol by carrier current over high-voltage power transmission lines has been practiced for more than 30 years. Application of similar techniques to telemetering over low-voltage lighting and power networks within a restricted area has, however, encountered special problems introduced by transformer equipment, power factor correction means and other connected operating equipment. The ability of a system to discriminate against noise is of primary importance since only through this ability can the integrity of signals associated with the time-duration system be assured.

It is, therefore, an object of this invention to provide means for transmitting and receiving time-duration telemetering signals by carrier current over low voltage power networks.

It is also an object of this invention to provide a frequency shift telemetering system of the time duration class in which one frequency determines the "on" period and the other frequency determines the "off" period.

It is also an object of this invention to provide a two channel carrier telemetering receiver in which one channel is rendered inoperative when the other channel is operative.

It is also an object of this invention to provide a frequency shift carrier telemetering system having a high degree of discrimination against noise and spurious signals.

For a fuller understanding of our invention, reference will now be made to the accompanying drawings and description in which we have illustrated and described a preferred embodiment of the invention. In the drawing FIGURE 1 is a diagrammatic view of the transmitting apparatus of a preferred embodiment of the invention;

Figures 1, 2:
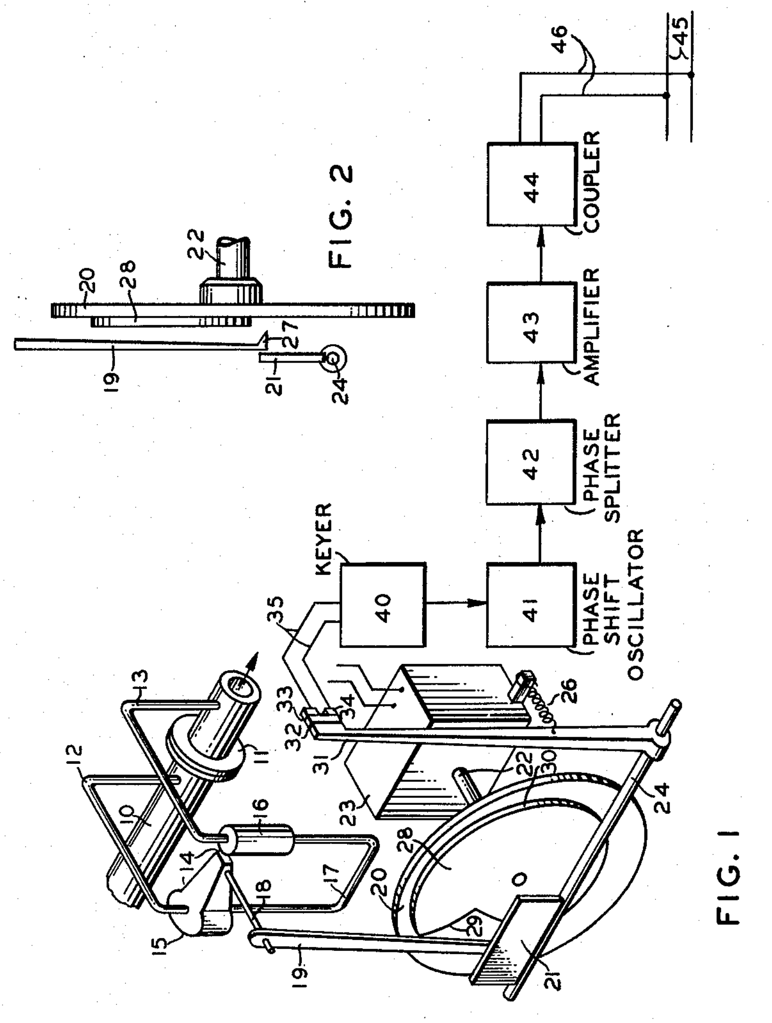
FIGURE 2 is a fragmentary elevational view showing a detail of the transmitter mechanism.

In FIGURE 1 are shown the elements of the carrier transmission system according to our invention associated with a typical telemetering transmitter and applied to a typical process application, for example, the measurement of flow of a fluid and the generation of signals in accordance therewith for transmission to a distant point. A type of impulse-duration telemetering transmitter particularly adaptable to this invention and applied to the aforesaid measurement problem is the subject of United States Patent 2,214,159, issued to F. B. Bristol, September 10, 1940, and assigned to the assignee of the present application.

The transmitting system as disclosed in FIGURE 1 comprises a pipe line 10 through which there is passing, in the direction indicated by the arrow, a fluid, the rate of flow of which it is desired to determine at a location remote from said line, and with provision for displaying the same at the remote location as a continuous graph of rates of flow. Inserted in the pipe line is an orifice-plate 11 of well-known construction and whereby the passage of fluid through the same sets up a pressure differential, which, through two conduits 12 and 13, is applied to a manometer element 14 of a conventional type. The manometer 14 embodies two chambers 15 and 16 containing a heavy liquid, such as mercury, and connected by a U-tube 17, whereby the pressure-differential in the two chambers due to flow of fluid in the pipe line 10 through the orifice-plate 11 produces a difference of level in the mercury surfaces in the two chambers. A spindle 18 is actuated by the manometer and carries an arm 19 deflecting to varying extents in accordance with the response of the manometer, and its position in the plane of deflection becomes a measure of flow through the pipe line 10—all of which is well understood and forms no essential part of the present invention.

In general accord with said patent referred to above, the plane of deflection of the arm 19 is caused to pass between a flat circular plate 20 to the rear and a flat "rocker-plate" 21 to the front, the path of deflection of the extremity of the arm being substantially radial to the circular plate 20. The said plate 20 is carried on a centrally disposed shaft 22; and the shaft, with the plate, is continuously rotated at a uniform velocity in a counterclockwise sense, as shown in the drawing, by a constant-speed motor 23, which may conveniently be a small synchronous motor with a suitable gear train, to give the plate 20 an angular velocity of, for example, four revolutions per minute.

The rocker-plate 21, as will be seen from FIGURES 1 and 2 is fixed to an oscillatable shaft 24, free to swing through a small angle transversely of the plane of travel of the arm 19, and is normally held toward the plate 20, by a small spring 26. Carried upon the extremity of the arm 19 is a rider 27, swinging freely with the arm 19 in the space normally provided between the plates 20 and 21. The rider 27 is shaped to present a flat bearing surface to the plate 21 and substantially a point contact with a cam member 28 upon engagement with the latter.

Affixed to the circular plate 20, and rotating therewith, is the flat cam member 28 having a leading edge 29 and a spiral trailing edge 30. The leading edge 29 is conformed to an arc concentric with the spindle 18, so that as the cam rotates, the edge 29 will engage the rider 27, and lift it into engagement with the rocker plate 21, causing the latter to be rocked in a sense perpendicular to that of rotation of the cam, and always at the same instant in the cycle of rotation of the cam, without regard to the deflected position of the arm 19 about the axis of the spindle 18. This effects a corresponding oscillation of shaft 24.

Attached to the shaft 24 is an arm 31 carrying on its extremity a circuit-controlling element 32 normally closing an electrical circuit at two contacts 33 and 34, said element acting to open the circuit when the plate 21 is deflected by the cam member 28. Thus, as the cam member 28 is continuously rotated with the plate 20, an electric circuit will be repeatedly closed and opened in definite cycles, as determined by the speed of the motor 23, the duration of each impulse so defined being dependent upon the angle subtended by the portion of the cam 28 engaged by the rider 27.

It will be seen from the foregoing that in each complete revolution of the cam member 28, a measurement of flow will be determined by an "on" period of the circuit-controlling element 32 and an "off" period, the sum of these periods being constant and equal to the period of revolution of the said cam member.

The electrical carrier wave network elements associated with the transmitter comprises a keyer 40 operating in cooperation with aforesaid circuit-controlling elements 32, 33 and 34 to cause a change in frequency of the currents generated by the phase-shift oscillator 41. There are thereby produced signals of two frequencies, one associated with the "off" period of the circuit controlling means and the other with the "on" period. These signal voltages are fed to a phase-splitter 42 for providing two equal signals of opposite phase as required by the push-pull output stage 43. Output coupling means 44 is provided particularly adapted to the requirements of coupling this network to a low voltage, low impedance power line 45 without incurring modulation of the carrier signal at the power line frequency and also without loss of sharpness of transition between the "off" signal and the "on" signal. This and other details of the transmitter circuit elements will be fully described hereinafter.

A power supply, not shown, is utilized to provide voltages and currents of appropriate character and constancy for the circuit requirements. Means for this purpose are entirely conventional and require no further comment. This may, of course, be fed from the same power line as that used for the telemetering signal.

It may be noted here that the present embodiment of our invention is a practical system for transmission of signals over a 120-volt, 60 cycle power distribution system, which includes power line 45, employing carrier currents of a frequency of the order of 15 kc. Frequencies below about 10 kc. were found to encounter noise of sufficient persistence to interfere with normal signals. By means hereinafter to be described, the base (lower) signal frequency is established by a plug-in network composed of resistance and capacitance components associated with the phase-shift oscillator. The second, or higher frequency can then be selected by simple rheostat adjustment depending on the desired frequency difference. Transmission over power networks has been obtained at a distance with a frequency difference of 300 cycles. In a practical embodiment of this invention, provision has been made for a range of frequency differences from 300 to 1000 cycles. Since in a given plant, a number of channels may be required to be superimposed on the same power network, the means provided is intended to make for convenient adaptation of each of a number of equipments according to this invention to individual frequency channels.

Figure 3:
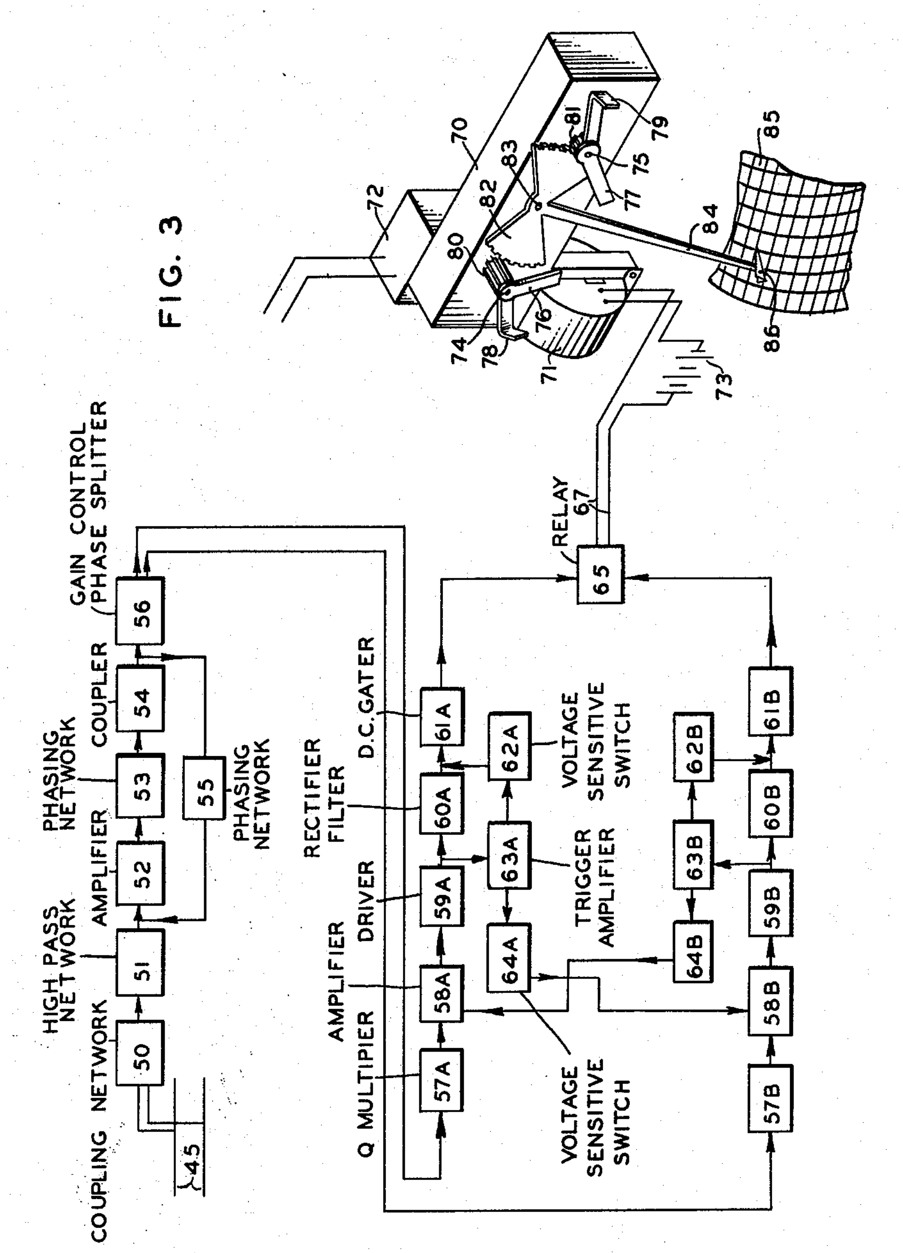
FIGURE 3 is a diagrammatic view of the receiving apparatus of a preferred embodiment of the invention.

In FIGURE 3 is illustrated the receiving apparatus according to this invention, circuit elements being shown in block form, for the purpose of preliminary description of the overall system. The incoming signal is taken from the power line 45 which, as in the transmitter, may be the same line that supplies the power source, not shown, for the receiver apparatus, commonly 120 volt, 60 cycle, alternating current. This source is of conventional design capable of furnishing all voltages and currents required, A.C. and D.C., and of suitable constancy. The carrier signal together with 60 cycle and other unwanted components first encounters the adjustable line-coupling network 50 which provides several steps of attenuation which may be selected in accordance with the characteristics of the line so that at a particular location of high carrier signal strength the system will not be overloaded and yet, at low signal levels, permit the system to be adapted to operate on microvolt signals without circuit modifications. The succeeding groups of circuit components, designated 51, 52, 53, 54, 55 and 56, together form particularly effective filtering means for the 60-cycle and noise components originating in the transmission line.

Its character is both active and passive. The first element 51 is a high pass coupling network and acts as a passive filter to reject most of the current of line frequency. Its output is fed to the amplifier 52 and, thence, to phasing network 53 which introduces a delay, or phase change in the unwanted components of the signal but passes the high frequency carrier signal on to the coupling network 54. From this output, the unwanted signal is fed back through the feedback and phasing network 55, suffering further phase change in order to appear as negative feed back in the input to amplifier 52, with regard to unwanted components of the original signal. Since network 55 acts as a low-pass filter section, the desired signal is rejected from this feedback path. The forward signal at network 54, now essentially cleared of unwanted components passes to the gain control and signal splitter 56. This separates the one signal path into two in preparation for identification of "on" and "off" impulses. It will be recalled that the transmitter impulses from signals of two frequencies, one associated with the "on" period and the other with the "off" period of the keying apparatus. The frequencies of these signals are spaced apart, of the order of 300 to 1000 cycles in practical usage, and it is to these characteristic frequencies the "Q multiplier circuit" elements, 57A and 57B employing resonant circuits are respectively tuned. The further action of the parallel channels, one identified with the "off" period of the signal transmission and the other with the "on" period is the same and, the description of one is identical with that of the other. It is a feature of this invention, however, that in these paths, when one is activated the other is positively blocked by subsidiary action of the signal, thus preventing any contribution of noise or other interference from activating the inactive channel or de-activating the operative channel. Hence, the operation of gate amplifiers 58A, 58B is dependent upon proper potential level being provided to all tube elements included therein. An operative signal having the "off" frequency passes through gate amplifier 58A and driver amplifier 59A which serve to boost the power level of signals. A part of the output from driver amplifier 59A is rectified and filtered to provide energizing voltages for a trigger amplifier 63A whose output controls voltage sensitive switches 64A and 62A. Through the former, voltage conditions are established in gate amplifier 58B effectively de-activating it and thereby rendering it incapable of transmitting undesirable noise, etc. Operation of the second switch 62A as a result of signal present in the "off" channel with which it is associated, results in positive bias being removed from a tube included in direct current gate 61A and, in response to the output signal of amplifier 59A rectified to a pulsating D.C. wave by rectifier and filter 60A, this tube is rendered nonconductive. De-activation of gate 61A in response to a signal in this channel prevents current from flowing in one of two operating coils of a polar relay 65, while the absence of a signal in the other or inactive channel allows current to flow in the other coil of this relay.

In the conjugate channel, the action of the circuit elements may be similarly traced. An operative signal having the "on" frequency passes through gate amplifier 58B and driver amplifier 59B, the output from the latter being in part rectified and filtered to provide energizing voltages for a trigger amplifier 63B. The output from trigger amplifier 63B controls voltage sensitive switches 64B and 62B, the former serving to establish voltage conditions in gate amplifier 58A effectively de-activating it and, as in the case of gate amplifier 58B when the "off" channel is actuated, rendering it incapable of transmitting undesirable noise, etc. The second switch 62B responds to the output from trigger amplifier 63B to remove positive bias from a tube included in direct current gate 61B so that the latter, in response to the output signal of amplifier 59B rectified to a pulsating D.C. wave by rectifier and filter 60B, becomes non-conductive and prevents current from flowing in the second of the two coils of the polar relay 65.

The terminal exhibiting means, as shown, is given as an example of means particularly adaptable to the illustrative transmitting means hereinbefore described. This is of the type set forth in U.S. Patent No. 2,040,918 issued to C. W. Bristol, May 19, 1936 and embodies two similar sets of gearing, oppositely and alternatively driven, and adapted respectively to impel an indicating or recording pointer toward one extreme or the other of a graduated scale, according to whether the "on" or the "off" telemetering impulse is existent in a circuit connecting with the relay 65. Such a mechanism is contained within the casing 70, FIGURE 3.

A constant-speed motor 72, through a gear system not shown in the drawing, but substantially identical with that disclosed in said patent No. 2,040,918, drives alternately and in opposite directions, according to the energization or de-energization of an electro-magnet 71, a pair of parallel spindles 74 and 75, to which are affixed respectively impeller members 76 and 77, having directions of driven rotation corresponding to that of their respective spindles 74 and 75. The magnet 71 receives energy from a battery or like source 73 through a circuit which includes the contacts of the polarized relay 65 and a two-conductor connecting circuit 67.

Rotatably mounted upon the spindles 74 and 75 are lever-arms 78 and 79, having affixed thereto pinions 80 and 81 respectively, both of which mesh with gear member 82, frictionally mounted upon a spindle 83, and carrying an extended indicating or recording arm 84, which may be deflected toward one or the other end of a graduated scale. The latter, as shown in FIGURE 3, takes the form of a record chart 85, driven in a conventional manner by timing elements (not shown in the drawing), whereby a marking member 86 carried on the extremity of the arm 84 may be caused to produce on the chart a permanent record of the positions of the arm.

The electrical and mechanical arrangement is such that upon the occurrence of an "on" impulse in the carrier transmitting and receiving circuits, coincident with the follower 27 (FIGURES 1 and 2) of the distant transmitter being disengaged from the cam 28, polar relay 65 through connecting circuit 67 causes the magnet 71 (FIGURE 3) to be energized, and the impeller 76 is advanced from its normal position of rest. Upon the follower 27 engaging the cam 28, the "on" impulse is interrupted, and the frequency passed on by the transmitter is that of the "off" signal. Polar relay 65 is shifted whereupon the magnet 71 is de-energized, with the result that the impeller 77 will at once begin to rotate from its position of rest.

Thus, according to whether the follower 27 is free of, or is in engagement with, the cam 28, the impellers 76 or 77 respectively will be caused to rotate in their respective senses, each, when released, resetting to its normal position of rest under the influence of springs (not shown in the drawing). The total time of each cycle of operation, as established by rotation of the cam 28, is thus divided into two intervals, during which the impellers 76 and 77 alternatively operate, the relative values of these intervals being governed by the deflected position of the arm 19 as established by the measured magnitude.

If the impulse causing the impeller 76 to deflect from its position of rest is of sufficient duration, the arm 78 will be engaged and carried along by the impeller, rotating the pinion 80, and thereby the gear 82, in a direction to advance the arm 84 toward the lower part of the chart scale 85. Upon termination of the impulse, the magnet 71 will be de-energized, whereupon the impeller 77 will at once begin its excursion from its position of rest (the impeller 76 meanwhile returning quickly to its stop); and, if the magnet remains de-energized for a sufficiently long time, the impeller 77 will engage the arm 79, and, acting through the pinion 81, will rotate the gear 82 in a sense to move the pointer arm 84 toward the upper end of the scale.

Since the pinions 80 and 81 are both permanently meshed with the gear 82, it will be apparent that upon the rotation of this gear by either pinion, the other pinion will rotate. Thus, the arms 78 and 79 have a definite relationship and, as arm 78 is forced in a "down scale" direction by action of the impeller 76, the arm 79 will rotate in the same angular direction, tending to approach the impeller 77, and vice versa. The speeds of the transmitting and receiving units are so related that the sum of the time interval required for one impeller to make its excursion and the interval required for the other impeller to reach a point where it just engages its related arm in the position to which said arm was moved by action of the first-named impeller through the pinions and the gear, is exactly equal to the time of one revolution of the cam in the transmitting unit, i.e., to the sum of the "on" impulse and the "off" impulse. Thus, with the measured quantity having a constant value, and the pointer arm 19 in the transmitter remaining at rest, the alternate effects of the impellers 76 and 77 in the receiving instrument will be such as definitely to position the arm 84 on the scale 85, and thereby provide a measure of that quantity. Upon a change in the magnitude of the measured condition, the relative durations of the impulses will correspondingly change, and the arm 84 will take up a new position representative of the condition.

Figure 4:
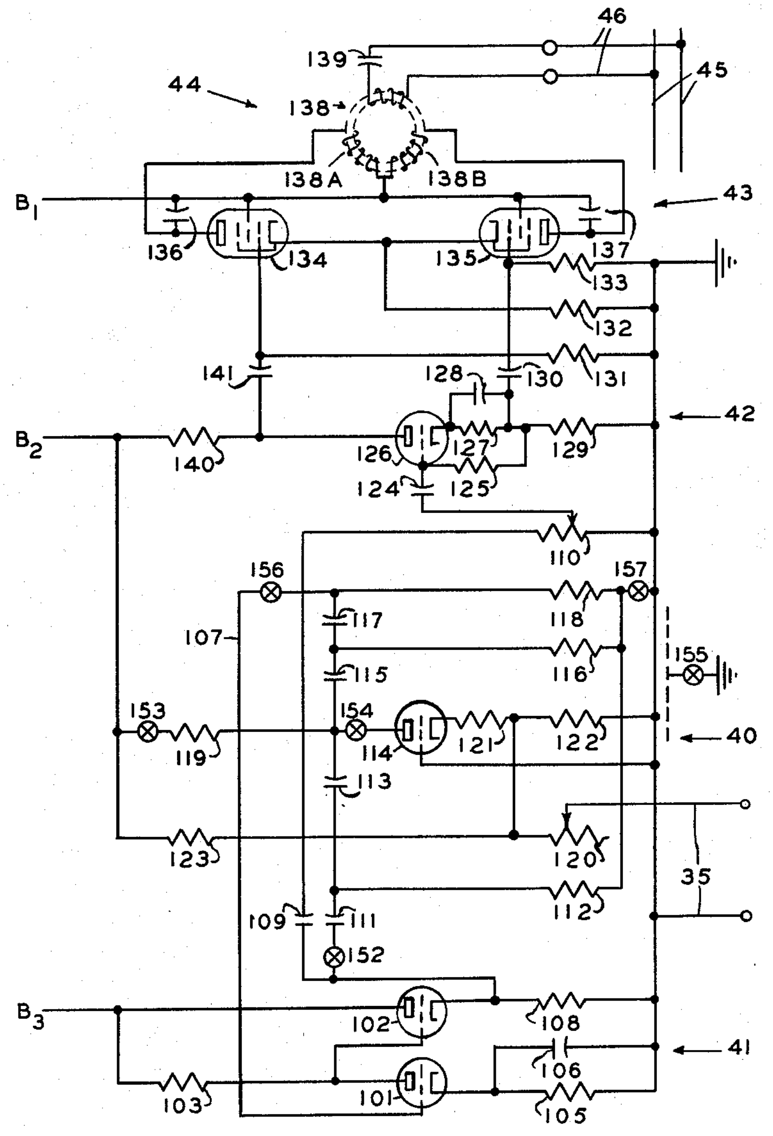
FIGURE 4 is a schematic diagram of the transmitting circuit of the telemetering system in accordance with FIGURE 1.

Referring now to the detailed circuit drawings, FIGURE 4 shows schematically a preferred form of circuit for a two-frequency carrier transmitting system according to this invention. Phase shift oscillator 41 which generates the carrier current comprises two triode electron tubes 101 and 102 and four R-C phase-shift sections. The grid of the triode 102 is directly coupled to the output circuit of triode 101 and anode voltages are supplied from a D.C. source, designated here as $B_3$, the supply to the anode of tube 101 including also a load resistor 103 across which the output signal can be developed. Grid bias for tube 101 is established by the cathode resistor 105 shunted by capacitor 106. Cathode resistor 108 develops a signal voltage which is coupled through capacitor 111 to the R-C phase-shift network consisting of four L-sections: the first including capacitor 111 and resistor 112; the second, capacitor 113, resistor 119 with triode 114 acting as a variable impedance for purposes of shifting frequency; the third, capacitor 115 and resistor 116; and the fourth, capacitor 117 and resistor 118. The output of this network feeds back regeneratively along lead 107 to the grid of electron tube 101 in proper phase relation to cause sustained oscillations of that tube.

The shift in frequency of the oscillator just described is determined by the electron tube 114 which acts as the keying tube of the keyer 40. This triode 114 has its grid grounded, and bias is established through cathode resistor 121. It receives plate voltage through resistor 119 from a source indicated by $B_2$. The cathode of tube 114 is supplied its voltage from source $B_2$ acting through voltage dividing resistors 123 and 122, resistor 120 being effective to shunt resistor 122 when the circuit formed by conductors 35 and switch contacts 33 and 34 is closed. With circuit 35 open, that is with the transmitter switch contacts 33 and 34 open, the $B_2$ voltage is fed through the voltage-dividing combination of resistors 123 and 122 and the tube cathode is biased to a positive value beyond the cut-off value. Now, when the transmitter contacts 33 and 34 are closed, resistor 120 is connected to ground, thereby shunting resistor 122 and altering the bias so that tube 114 conducts and effectively changes the impedance of the tube as a component of the phase-shift network and, correspondingly, the frequency of the system. The base frequency of the system, however, is determined importantly by the total phase-shift value of the R-C elements with the transmitter key open.

By this means, carrier currents of two frequencies are established, one (the base frequency) associated with the "off" period of the transmitter mechanism, and the other, a higher frequency, associated with the "on" period. The amount of frequency shift may be readily varied in a practical embodiment of the circuit by using an adjustable resistor for resistor 120 as shown. A useful range of operation has been found to be made possible by arranging the adjustable resistor 120 for a maximum value to effect a shift of 300 cycles per second while zero value gives a 1000 cycles per second shift. By the location of the keying tube it provides its variable impedance to the intermediate sections of the phase-shift network, thereby assuring that its impedance is not reflected to a significant extent into either end section thereof.

The keyed oscillator signal derived from the cathode circuit of tube 102 is fed through a coupling capacitor 109 to a gain control potentiometer 110 providing for adjustment of signal level supplied to the phase-splitter 42 having the purpose of dividing the signal into equal halves for feeding the push-pull output stage following. The phase-splitter circuit is a conventional means of dividing the load between the plate and the cathode circuits in an amplifier stage. Here, the input signal is coupled to the grid of triode 126 through capacitor 124. Grid bias is determined by grid resistor 125 in combination with the cathode resistor 127 which is bypassed for signal voltages by capacitor 128. Plate voltage is derived from a D.C. source $B_2$ acting through an anode load resistor 140, this resistor being selected of a value equal to that of cathode load resistor 129. The output is in two parts, equal in magnitude and opposite in phase, of which one part coupled through capacitor 130 and derived from the current through load resistor 129 in the cathode circuit is fed to tube 135; the second part coupled through capacitor 141 and derived from the current through resistor 140 is fed to tube 134.

The push-pull output stage 43 functions to increase the power-level of the signal to a useful value suitable for transmission over electric power lines of such extended length and impedance characteristics as are met in industrial practice. The stage comprises two power-pentode type electron tubes, 134 and 135, the control grid of the first receiving the signal from the anode circuit of the phase-splitter 42, and the control grid of the second receiving the signal from the cathode circuit as hereinbefore described. In a conventional manner, bias is established between the grids and cathodes of both pentodes through cathode resistor 132. The suppressor grids are tied to the cathodes of their respective tubes. Plate voltage is supplied from a D.C. source $B_1$ to the plates and screen grids of both tubes but in the case of the plates passes first through the respective portions 138A and 138B of the primary of the output transformer 138. Capacitors 136 and 137 are chosen of such a value that the input sections are capacitively tuned for maximum transfer of signal.

The output coupling 44 includes a toroidal powdered iron core output transformer with a split primary winding. As described above, the outputs of the power pentodes 135 and 136, by the connection of their plates and screen grids across the respective primary windings 138A, 138B, is applied to this output transformer. The secondary is connected to the output conductors 46 through a coupling capacitor 139. Output circuit 46 is connected directly across a commercial power distribution line represented by conductors 45. In order to maximize the output, capacitor 139 is selected of a value to balance average inductive line impedances at the signal frequencies. A practical value of such capacity for usual line impedances of about 1.15 to 5.00 ohms and signal frequencies of 15 kilocycles per second is about 5 mfd.

The particular virtue of the powdered iron core toroid may be readily understood by comparison with the action of a conventional "high quality" transformer for coupling, as presupposed here, to the 60 cycle power line. In such a case, low frequency would be passed in either direction through the transformer. The transformer impedance to 60 c.p.s. is high and even with the coupling capacitor 139 interposed, an appreciable low frequency voltage would appear across the secondary. By virtue of turns ratio transformation, a relatively large low frequency voltage would be fed back to the plates of the output tubes, thus becoming superimposed on the normal D.C. plate supply. This would cause plate modulation of the desired high frequency signal by the low frequency and the modulated signal would pass through the transformer to the transmission line and on to the distant receiver. The receiver will be more fully described hereinafter but it may be noted that while at the receiver high pass filters are present to reject unwanted low frequencies, a signal modulated as above would appear as side bands able to pass such filters and, in the final product, lead to erratic pulse length and distortions of the square-wave impulses characteristic of the desired "on" and "off" impulses.

In contradistinction to the above-described action, the powdered iron core transformer 138 presents a very low impedance to low frequency, in particular, the 60 cycle per second power frequency, so that practically all of the line voltage appears across the coupling capacitor 139 and very little across the transformer secondary. Furthermore, advantage can be taken of the fact that the coupling capacitor can be of a value incompatible with any resonance condition at the power frequency. By this means, and since the core is ineffective for the transfer of low frequency voltage, very little appears on the plates of the output tubes 134 and 135. However, the transformer is very effective at the high frequency so that a large signal appears at its secondary and is applied to the transmission line through the coupling capacitor 139 which has very low impedance at this high frequency. The use of the toroidal form for the powdered iron transformer core is preferable by reason of the reduced core length and its compactness allowing close coupling between windings.

Figure 5:
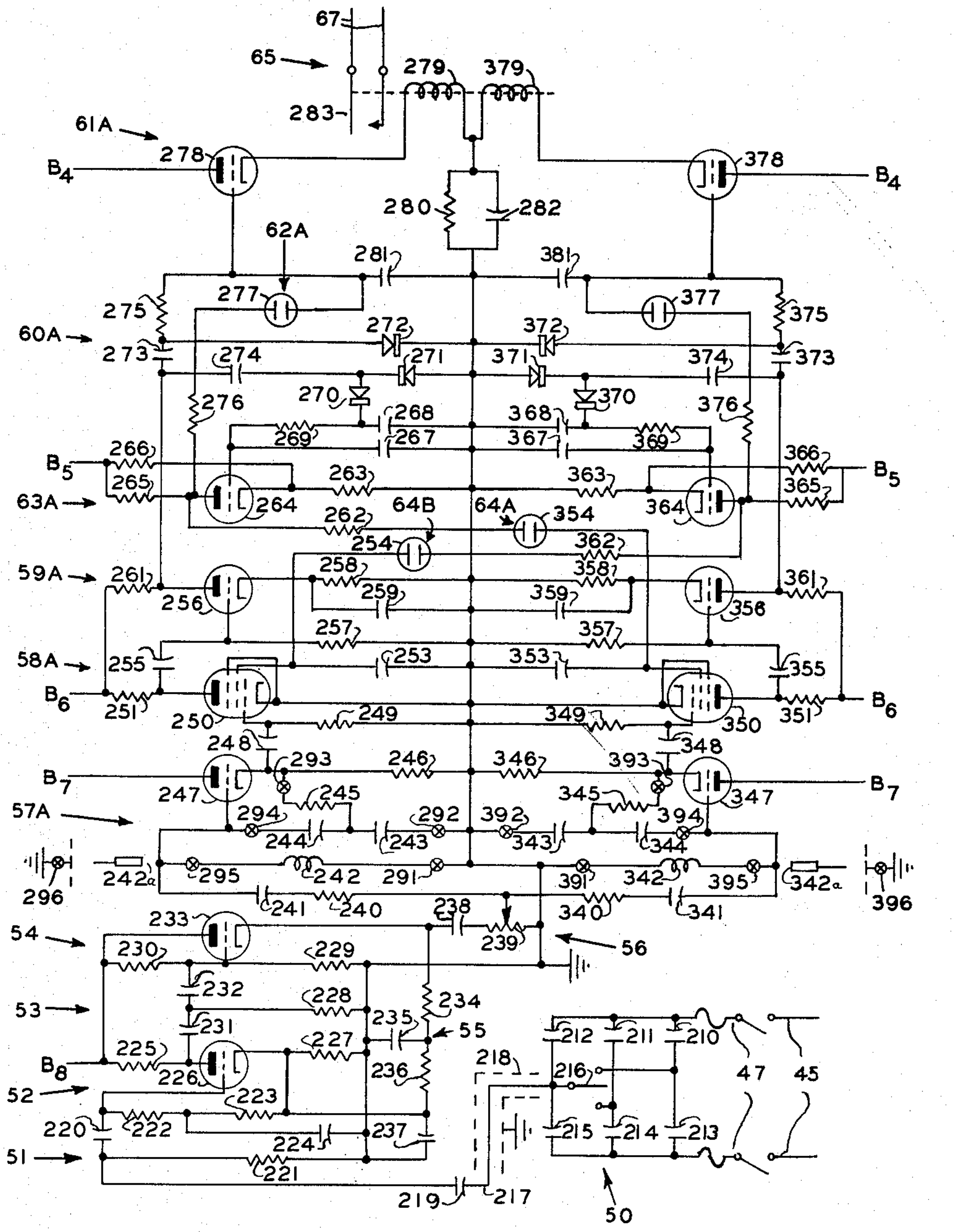
FIGURE 5 is a schematic diagram of the receiving circuit of the telemetering system according to FIGURE 3.

The receiver equipment, already described generally in connection with FIGURE 2, will now be described in greater detail in connection with FIGURE 5 to which attention is now directed. As before, the receiving equipment is at a location remote from the transmitter equipment of FIGURES 1 and 4 but connected to it through the common transmission line 45 which usually is in use simultaneously for other purposes, as in the present example, a low frequency power distribution network.

The conductors 45 carry the transmitted signal together with the assumed low frequency line voltage through safety fuses 47 to an adjustable coupling network 50. In this network a three-position switch 216 is provided to permit selection of any one of three combinations of capacitors, 212 and 215, 211 and 214, and 210 and 213, by which three steps of attenuation accommodate the receiver roughly to the signal strength existing at the particular location. The three pairs of capacitors are connected in parallel across the conductors 45 with the pair made up of capacitors 212 and 215 having their common junction connected to the pole of switch 216 while the common junction of capacitors 211 and 214 is connected to one contact of the switch and the common junction of capacitors 210 and 213 is connected to the other contact. When switch 216 is open, as shown, the signal is taken from the center of capacitors 212 and 215. Depending upon which closed position of the switch is selected, the center of capacitors 211 and 214 or the center of capacitors 210 and 213 is connected to the center of the first pair, capacitors 212 and 215.

In connecting the input to pairs of capacitors and taking the output from the center of each pair, some signal is lost but the advantage gained is that the polarity or grounding of one of the conductors 45 has no effect on the subsequent receiver circuitry and in making connection to the power line, polarity may be ignored.

From the attenuator, the transmission line voltages are fed through line 217, surrounded by a grounded enclosure 218, to coupling capacitor 219 and, thence, to the high pass coupling network 51. This is the initial element in a series of filtering means designed to eliminate low frequency line voltages and discriminate between the desired signal and noise in an overall ratio of about one part in $10^8$. The high pass network consists of two RC filter sections including capacitor 219 already mentioned, with resistor 221, and capacitors 220 and 224 with resistor 222.

The network 51 is followed by an amplifier stage 52. The signal at this point is now well cleared of low frequency power voltages by attenuation of the order of 40–48 db but components of undesired low frequency noise are still present. This signal is coupled to the grid of triode 226, grid bias being obtained by space charge means (so-called "contact potential bias") in coaction with resistors 222 and 223, the former of which has already been referred to as effective in the second high-pass filter section. Capacitor 224 has also multiple functions, acting not only as a filter component as described above but also as an effective signal ground for the common terminals of resistor 222, the load resistor of the second section of the high-pass network, and resistor 223. Capacitor 224 also functions as a blocking capacitor to prevent feedback, from means to be hereinafter described, from reaching the grid of tube 226. Provision for a second input from feedback means 55 to be described in detail presently, is made to the cathode of tube 226. Thus, this tube, with respect to undesired low-frequency "noise," is adapted to utilize two inputs so as to act as an algebraic difference amplifier. The main signal is applied to the grid and the fed-back signal is applied to the cathode, whence the resultant signal will be the algebraic difference of the inputs.

Following, first, the grid signal on tube 226, the amplified output is applied to a phasing network 53 comprising capacitor 231 in conjunction with resistor 228 and capacitor 232 with resistor 229. These act as high-pass filter sections for the carrier frequency but as phase-changing or delay means for unwanted low-frequency noise. The signal then passes to the coupling network. This consists of a triode 233 which is arranged to operate as a conventional cathode follower amplifier in which anode voltage is derived from a source marked $B_8$. Positive grid voltage is obtained in this case by a voltage divider across the $B_8$ supply, formed by resistors 230 and 229, in order to offset the positive cathode voltage derived from load resistors 234, 236 and 227. This arrangement thus forms a cathode follower circuit providing a part of the output of which is fed back by the feedback and phasing network. The circuit components, namely resistor 234 with capacitor 235, and resistor 236 with capacitor 237, serve to shift the phase of the fed-back signal so that it is now as applied to the cathode of tube 226 in phase with the signal on the grid of that tube. Thus, the high frequency components of the signal are excluded from this feed-back path and the low-frequency unwanted components appear as a negative feedback in the cathode circuit of tube 226 diminishing thereby low frequency components of the original signal. This combination has been found to provide rejection of the unwanted 60 cycle component of the signal in a ratio of more than 1000 to 1 with respect to the wanted high-frequency signal. The coupling circuit 54 furnishes the necessary signal power to the feedback network 55 and, in the forward direction, to the signal splitter and gain control 56.

The signal splitter and gain control 56 comprises the capacitor 238 and adjustable voltage dividing resistor 239 and the two resistors, 240 and 340. Thus, the signal is here divided between two channels. Capacitor 238 provides for isolation of direct current from this circuit and the voltage divider provides for finer gain control within the limits of the adjustable line-coupling network 50 described above. In connection with the Q-multiplier circuits 57A and 57B, which follow and act to establish the two channels, it may be noted that since the input impedance of these circuits is greater than 5 megohms, the resistors 239 and 240 provide, in effect a unilateral transfer path, that is, for signals feeding from tube 233 to each of the Q-multiplier circuits 57A and 57B through the components 238, 239 and 240, the impedance relationships are such that signals "see" a load of relatively high impedance with consequent low signal loss of the order of 1.2 db. In the reverse direction, that is, if any tendency to oscillate exists in the multiplier circuits, the attenuation of any such voltages is high, of the order of about 44 db.

In the remainder of this receiver circuit, it is not considered necessary to describe in detail the elements of each of the two signal channels since they are essentially identical except for the frequency of the signal transmitted. The signal will therefore be followed through the Q-multiplier circuit 57A and on through the succeeding stages.

The multiplier circuit 57A comprises capacitor 241, inductor 242, capacitors 243 and 244, tube 247 and resistors 245 and 246. Tuning is accomplished by means of the slug-tuned inductance coil 242 and 242*a* which has the capacitors 243 and 244 in series across it. Shielding is of especial importance at this point and barrier shields are provided to separate the circuits at the base of tube 247 and the inductance 242 is can-shielded. Now, when a signal of appropriate frequency is applied through capacitor 241, the tuned circuit tends to resonate. Since capacitor 241 and the resonant circuit are both connected to the grid of tube 247, tube 247 furnishes a cathode output and provides for impedance transformation. Part of the ouptut of this tube, developed across resistor 246, is fed back through resistor 245 to the common point between the capacitors 243 and 244, whose impedances are in the approximate ratio of 1 to 9 respectively, so that the voltage applied to the grid of tube 247 is proportionately increased. The proportions of the capacitor 243 and the feedback resistor 245 are selected to obtain a high Q factor without encountering sustained oscillations. Since a small voltage of signal frequency at the junction of capacitors 243 and 244 results in a larger signal at the grid of tube 247, the effective band width of the resonant circuit is decreased and the Q is effectively multiplied in a practical case by a factor in excess of 160. In the forward direction, the output signal developed across resistor 246 is also fed through the coupling capacitor 248 to the gate amplifier 58A.

In accordance with this invention, the gate amplifier 58A acts as a conventional amplifier but means are also provided for preventing the gate amplifier from passing on any noise or interference when a signal is not present in its channel. This amplifier comprises capacitors 248 and 253, resistors 249 and 251 and pentode type electron tube 250. The operation of this amplifier depends upon proper potentials being provided to all tube elements. In the case now assumed, a signal is present in the grid circuit of tube 250 through the resistor 249. The screen grid is connected through a neon lamp 254 to resistor 362 which is in turn connected to the plate of tube 364 in the other channel, as will be more fully pointed out hereinbelow, and is supplied from the source $B_5$ through resistor 365. The action of these components will be more fully discussed hereinafter; let it suffice to say here that, with signal present, this screen voltage is of a value to permit normal amplification in this tube. Plate voltage is established by current through resistor 251 connected between the plate of tube 250 and source $B_6$ and the signal passes to the grid of the next amplifier stage through coupling capacitor 255 and grid resistor 257.

Driver amplifier 59A is of conventional design serving to raise the power level of the signals. Grid-cathode bias for triode 256 is effected by cathode resistor 258 and by-pass capacitor 259 connected in parallel between the cathode and ground. Anode voltage is established by current through resistor 261 connected between source $B_6$ and the anode of tube 256.

Now as described in connection with FIGURE 3, the output of the driver amplifier 59A divides between the trigger amplifier 63A and the rectifier and filter 60A. For this purpose, the anode of tube 256 is connected through capacitor 273 to resistor 275 which is in turn connected to the grid of triode electron tube 278 and through voltage-sensitive switch 277 and resistor 276 to the plate of triode electron tube 264. Capacitor 274 is connected on one side to the junction between capacitor 273 and the anode of tube 256 and on its other side is connected to rectifiers 270 and 271 in a conventional series-fed type of half-wave voltage doubler circuit with a capacitor 268 being shunted across its output to ground and a further connection from rectifier 270 to a resistor 269. The resistor 269 in combination with capacitor 267 forms a time delay circuit, the junction therebetween being connected to the grid of electron tube 264 and the other end of capacitor 267 being connected to the common ground. A direct link is provided, as was described hereinabove in connection with the screen grid of tube 250 and the anode of tube 364, between the anode of tube 264 through resistor 262 and neon lamp 354 to the screen grid of tube 350 in the amplifier circuit 58B in the other channel. The anode of triode 264 is connected to the $B_5$ supply through resistor 265 while the cathode of this tube is connected to the $B_5$ supply by its connection to the junction between voltage-dividing resistors 263 and 266, resistor 266 being connected to the $B_5$ supply and resistor 263 being connected to ground.

Following first the forward signal, it is fed through capacitor 273 and is half-wave shunt rectified by diode rectifier 272, the positive half of each cycle being passed to ground through the rectifier. The resulting pulsating direct current is filtered by the capacitance filter comprising resistor 275 and capacitor 281. This direct current pulse is now supplied to the D.C. gate 61A. This gate member comprises the triode electron tube 278, the cathode of which is connected to one side of relay coil winding 279 of polar relay 65. The other side of winding 279 is connected to ground through parallel connected resistor 280 and capacitor 282. The anode of tube 278 is connected to source $B_4$. The control grid of tube 278 is alternatively subjected to a negative cut-off potential from the D.C. signal pulse or a positive saturating potential supplied through the voltage-sensitive switch 277 whose function will be further discussed hereinafter. Thus, the presence of a signal in this channel will substantially cut off the flow of current through this tube and, hence, through the relay winding 279 in the cathode circuit. During periods of no signal in this channel, positive voltage on the grid causes maximum current flow in the tube and the relay coil.

The polar relay 65 joins the two channels through its two operating coils 279 and 379. Thus it operates as a differential device, that is, if both coils are energized or de-energized at the same time, no operation will occur and its armature is not disturbed. Normally, one coil or the other will be energized during the no signal condition on its channel. In this state there is a high positive pedestal on the gate 61A, that is, the high positive grid potential relative to its cathode, so that noise on that channel will have difficulty in causing any change. At the same time, the opposite channel is producing a negative signal at its gate tube to keep it cut off. Reduction of signal on the channel whose gate tube is cut off needs to be considerable before the gate tube will start to conduct and permit current to pass through the associated winding of relay 65. Even so the relay will not transfer until the opposite channel takes over and cuts off the flow of current through its winding of relay 65. With equal currents applied to both windings, the relay will not be operated as is the case, of course, when no current is applied to either winding. Noise impulses then, by affecting both channels simultaneously and with the same delays, cause the relay to be affected only to a very small degree if at all. If the other means of noise rejection should fail, this provides additional means of fail safe operation.

In the present instance, as was pointed out hereinabove, relay 65 is operated to hold its contacts 283 open for a duration corresponding to the duration of the "off" frequency. This corresponds to the presence of a signal in the "off" frequency channel, as was described, there being no current through relay winding 279 while current is flowing through relay winding 379 under these conditions.

The "on" frequency channel of the receiver is identical in construction and operation to the "off" channel just described. For purposes of simplification and in order to avoid unnecessary repetition the elements of the "on" channel have been designated by a three digit reference character having the same units and tens digits as the corresponding elements in the "off" channel but with a "3" as the hundreds digit. Thus, the foregoing description of the "off" channel is converted to the corresponding description of the "on" channel by converting each "200" series reference character to the corresponding "300" series by changing the hundreds digit from "2" to "3."

We may now return to the discussion of the subsidiary circuits of the active channel. The secondary path for the signal output of driver amplifier 59A is to trigger amplifier 63A. This unit comprises three parts:

(a) Capacitors 274 and 268, and rectifiers 270 and 271 as the voltage doubling rectifier.

(b) Resistor 269 and capacitor 267 act as a time delay and filter.

(c) Resistors 263, 265 and 266, and tube 264 as the trigger amplifier.

The rectifier-filter combination utilizes a portion of the signal to provide a positive potential to the input of tube 264, which is normally operated beyond cutoff because of the high cathode bias obtained from the voltage divider 266 and 263. In order to operate the trigger circuit, this initial bias has to be overcome by the rectified signal. To prevent noise impulses from operating this trigger circuit, the small time delay filter, resistor 269 and capacitor 267, is provided between the rectifier and the trigger circuit. This allows a steady signal to operate the system with a slight delay, but noise impulses are integrated and hence have little effect. In a time impulse duration telemetering system, delay can result in an inaccuracy. However, since the time delay of .02 second applies to both the start and termination times of the signal in each channel, the proportionality of the on-off ratio is maintained and there is no deleterious effect on accuracy.

The trigger amplifier is connected to two voltage-sensitive switches 62A and 64A in its anode circuit. In the present embodiment each of these consists of a neon gas-filled lamp indicated at 277 and 354, connected in series together with a current-limiting resistor. Their operation depends on the well-known principle of the voltage characteristic of the ionization potentials of gases. Considering the action of the lamp 354, when signal is present in the one channel, the anode voltage of tube 264 falls below the extinction voltage of the neon tube 354, hence, this switching element no longer carries current to the screen grid of the gate amplifier tube 350 in the other channel causing it to be inoperative as an amplifier and, thus, effectively deactivating it during the presence of signal in said one channel. In the alternate condition, the signal disappears in tube 264, the anode current decreases causing its voltage to rise above the ionization point in the neon tube switch element rendering the same conductive and voltage thereby appears on the screen of tube 350 rendering it operative as a normal amplifier.

The second voltage sensitive switch 62A is essentially similar to the first and consists of the current limiting resistor 276 and the neon lamp 277. The presence of signal in the channel, as stated above, causes the trigger tube 264 to draw current and thus the voltage drop through anode resistor 265 lowers the anode voltage to a point below the ionization potential of the neon tube 277. This removes the positive bias from the gate tube 278 and, due to the presence of rectifier 272, negative bias is applied to its grid. When signal falls in this channel, the trigger tube 264 does not have rectified current supplied to its grid circuit and the tube is thus held in a cutoff state. Hence, the anode voltage attains its maximum excursion in the positive direction, thereby applying a sufficient potential to cause conduction through the neon lamp circuit and a positive voltage is applied to the grid of gate tube 278. Any undesired signals or noise impulses at this point must overcome the resultant positive level of voltage to affect the gate action of tube 278. Complete discrimination is therefore accomplished between the signal-state and the no-signal state in each channel.

Figure 6:
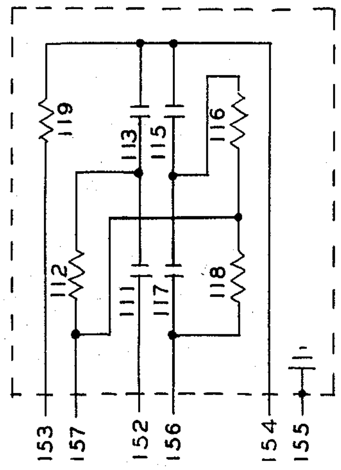
FIGURE 6 is a schematic diagram of a plug-in assembly of circuit components associated with the telemetering transmitter system according to this invention.

In a practical embodiment, means have been provided for convenient alteration of the circuits for the purpose of establishing any desired base frequency. This is useful since in practice, a transmission system is usually required to carry a number of separate measuring channels and the telemetering apparatus therefore should be easily available for use on any frequency channel within a wide range without breaking into permanent circuit wiring. To this end, certain components of the transmitter circuit are grouped in a shielded enclosure which is adapted for plugging into a receptacle permanently wired into the circuit. The values of the components are chosen for a particular narrow frequency band channel and, thus, a particular channel frequency band would be established in practice by selecting and inserting into the receptacle provided therefore a plug-in unit having the appropriate circuit elements. The points in the circuit at which the plug-in elements are connected are indicated by the numbers 152 to 157 inclusive in FIGURE 4 and the corresponding terminals of the plug-in unit are shown similarly numbered in FIGURE 6.

Figure 7:
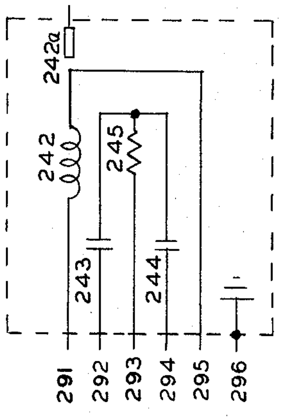
FIGURE 7 is a schematic diagram of circuit components associated with the telemetering receiver system.

In the receiver circuit, a similar segregation of those elements by which the channel frequency bands are established are shown in FIGURE 7 as arranged in the "off" channel, it being understood that the terminal members 391 to 396 (FIGURE 5) indicate the corresponding arrangement in the other channel which arrangement also is conveniently utilized. As before, in practice these are enclosed in a shielded unuit and terminal pins provided for plug-in use. The terminal numbers, 291 and 296 inclusive (also 391 and 396), correspond to similar numbers in FIGURE 5, indicating the points in the circuit at which the plug-in receptacle permits the frequency-establishing component to be plugged into the permanent circuitry. A complete telemetering system therefore requires three properly matched plug-in units, one in the transmitter and two in the receiver.

While the foregoing invention has been described as applied to "low-voltage" power transmission line, it will be readily apparent that the frequency shift means of our invention applies only to the carrier current and is in no wise limited by the basic voltage of a power system over which the telemetering transmission is carried out.

The terms and expressions which have been employed are used as terms of description and not of limitation, and there is no intension, in the use of such terms and expressions, of excluding any equivalents of the features shown and described or portions thereof, but it is recognized that various modifications are possible within the scope of the invention claimed.

I claim:

1. In an impulse-duration telemetering system for indicating at a remote station the value of a measured variable, means for transmitting over a connecting link a succession of periodic signals each made up of a period of a first wave train of one frequency and a period of a second wave train of another frequency, first and second receiving means coupled with said link responsive respectively to said first and second wave trains and tuned to reject said second and first wave trains respectively, indicating means responsive to said first and second receiving means, said first receiving means in response to a first wave train actuating said indicating means in one direction for a duration corresponding to the length of the first wave train and simultaneously rendering said second receiving means unresponsive to signal for the duration of said first wave train, and said second receiving means in response to a second wave train actuating said indicating means in the opposite direction for a duration corresponding to the length of the second wave train and simultaneously rendering said first receiving means unresponsive to signal for the duration of said second wave train.

2. In an impulse-duration telemetering system for indicating at a remote station the value of a measured variable, means for transmitting over a connecting link a succession of periodic signals each made up of a period of a first wave train of one frequency and a period of a second wave train of another frequency, said means including a powdered iron core transformer coupling said transmitting means with said connecting link and having a relatively low impedance to current of a frequency which is small compared to that of said wave trains, receiving means coupled with said link and forming first and second channels, each of said channels comprising Q multiplying means, amplifier means and output stages coupled in that sequence and trigger means for controlling the flow of current in the output stage, said Q multiplying means being tuned for response to said first and second wave trains respectively for driving the amplifier means associated therewith and for rejecting said second and first wave trains respectively, said trigger means in each of said channels having an input circuit coupled with the amplifier means in parallel with the output stage whereby the impedance of said trigger means is reduced when the amplifier means is driven and an output circuit coupled with the output stage for maintaining the output stage conductive when the associated amplifier means is passive and together with the amplifier means maintaining the output stage relatively nonconductive in the periods of and for a duration corresponding to the length of the wave train to which the channel is responsive, time delay filter means coupled in the input circuit of said trigger means for uniformly delaying the start and termination of its response to the amplifier means associated therewith and for integrating noise impulses, said channels each including one normally nonconductive voltage responsive means coupled between the output circuit of the trigger means and the output stage associated therewith and which is conductive in response to the relatively high impedance condition of said trigger means, another normally nonconductive voltage responsive means in each of said channels which is conductive in response to the relatively high impedance condition of the trigger means and coupled between the trigger means of one channel and the amplifier means of the other channel whereby to render the latter nonconductive when the amplifier means of the one channel is being driven, and means responsive to the condition of said output stages for providing a representation of the value of said variable.

3. In an impulse-duration telemetering system for cooperation with a supply line connected to a source of alternating voltage and for indicating at a remote station the value of a measured variable, means for transmitting over said supply line a succession of periodic signals each made up of a period of a first wave train of one frequency and a period of a second wave train of another frequency, first and second receiving means, a plurality of pairs of capacitors with the capacitors of each pair connected in series across the supply line, means connecting said first and second receiving means to one of said pairs and for selectively connecting the same to another pair, said first and second receiving means being responsive respectively to said first and second wave trains and tuned to reject said second and first wave trains respectively, indicating means responsive to said first and second receiving means, said first receiving means in response to a first wave train actuating said indicating means in one direction for a duration corresponding to the length of the first wave train and simultaneously blocking said second receiving means for the duration of said first wave train, and said second receiving means in response to a second wave train actuating said indicating means in the opposite direction for a duration corresponding to the length of the second wave train and simultaneously blocking said first receiving means for the duration of said second wave train.

4. An impulse-duration telemetering system as set forth in claim 3, in which said connecting link is an alternating current supply line for alternating current having a frequency lower than said one and another frequencies and in which said means connecting said first and second receiving means to said pairs of capacitors comprises high-pass filter means for passing said one and another frequencies and for attenuating said alternating current frequency, amplifier means having input and output circuits with the input circuit coupled with said high-pass filter means, a cathode follower stage, phase-shift means coupling the output circuit of said amplifier means with said cathode follower stage and adapted for shifting the phase of signal components at the frequency of said alternating current, and feedback means coupling the output side of said cathode follower stage with the input circuit of said amplifier means for further shifting the phase of said signal components so as to substantially nullify the effect thereof on the output of said amplifier means.

5. An impulse-duration telemetering system as set forth in claim 4 wherein said transmitting means includes a powdered iron core transformer for coupling the same with said supply line, said transformer having a relatively low impedance to said alternating current as compared to said one and another frequencies.

6. In an impulse-duration telemetering system in which first wave trains of one frequency each representative of an "on" impulse alternate with second wave trains of another frequency each representative of an "off" impulse, first receiving means responsive to said first wave trains for providing an output representative of the duration of each of said first wave trains, second receiving means responsive to said second wave trains for providing an output representative of the duration of each of said second wave trains, said first and second receiving means including first and second amplifier means each comprising a plurality of electrodes defining a conduction path, and means coupling said first and second receiving means with one of the electrodes in said second and first amplifier means respectively whereby in response to said first wave trains in said first receiving means conduction is blocked along the path in said second amplifier means and in response to said second wave trains in said second receiving means conduction is blocked along the path in said first amplifier means.

7. In an impulse-duration telemetering system in which first wave trains of one frequency each representative of an "on" impulse alternate with second wave trains of another frequency each representative of an "off" impulse, means defining two receiving channels each comprising Q multiplying means, amplifier means and an output stage coupled in that sequence and trigger means for controlling the flow of current in the output stage, said Q multiplying means being respectively tuned for response to said first and second wave trains for driving the amplifier means associated therewith and for rejecting said second and first wave trains respectively, said trigger means in each of said channels having an input circuit coupled with the amplifier means in parallel with the output stage whereby the impedance of said trigger means is reduced when the amplifier means is driven and an output circuit coupled with the output stage for maintaining the output stage conductive when the associated amplifier means is passive and together with the amplifier means maintaining the output stage relatively nonconductive for a duration corresponding to the length of the wave train to which the channel is responsive, and normally nonconductive voltage responsive means in each of said channels which are conductive in response to the relatively high impedance condition of the trigger means and coupled between the trigger means of one channel and the amplifier means of the other channel whereby to render the latter nonconductive when the amplifier means of the one channel is being driven.

8. An impulse-duration telemetering system as set forth in claim 1 wherein said first and second receiving means each normally provides an output current in the absence of signal and cuts off its output current in the periods of and for a duration corresponding to the length of said first and second wave trains respectively, means for actuating said indicating means responsive to the output of said first and second receiving means whereby said indicating means is operated in one direction for a duration corresponding to the length of said first wave trains in response to said output current of said second receiving means and cutoff of the output current of said first receiving means and in the opposite direction for a duration corresponding to the length of said second wave trains in response to said output current of said first receiving means and cutoff of the output current of said second receiving means, means responsive to said first wave trains in said first receiving means for maintaining said second receiving means ineffective to terminate its output current in response to a signal, and means responsive to said second wave trains in said second receiving means for maintaining said first receiving means ineffective to terminate its output current in response to a signal.

9. In an impulse-duration telemetering system as set forth in claim 1 wherein said means for transmitting over said connecting link includes a powdered iron core transformer coupled with said connecting link and having a relatively low impedance to current of a frequency which is small compared to that of said wave trains, each of said first and second receiving means comprising Q-multiplying means, amplifier means, and output stages coupled in that sequence and trigger means for controlling the flow of current in the output stage, said Q-multiplying means being tuned for response to said first and second wave trains respectively for driving the amplifier means associated therewith and for rejecting said second and first wave trains respectively, said trigger means in each of said receiving means having an input circuit coupled with the amplifier means in parallel with the output stage whereby the impedance of said trigger means is reduced when the amplifier means is driven and an output circuit coupled with the output stage for maintaining the output stage conductive when the associated amplifier means is passive and together with the amplifier means maintaining the output stage relatively nonconductive in the periods of and for a duration corresponding to the length of the wave train to which the receiving means is responsive.

10. An impulse-duration telemetering system as set forth in claim 9 wherein said first and second receiving means each includes one normally nonconductive voltage responsive means coupled between the output circuit of the trigger means and the output stage associated therewith and adapted to be conductive in response to the relatively high impedance condition of said trigger means, another normally nonconductive voltage responsive means in each of said receiving means adapted to be conductive in response to the relatively high impedance condition of the trigger means and coupled between the trigger means of one receiving means and the amplifier means of the other receiving means whereby to render the latter nonconductive when the amplifier means of the one receiving means is being driven.

References Cited in the file of this patent

UNITED STATES PATENTS

| | | |
|---|---|---|
| 2,088,568 | Beecher | Aug. 3, 1937 |
| 2,208,377 | Luck | July 16, 1940 |
| 2,698,410 | Madsen | Dec. 28, 1954 |
| 2,794,860 | Scholten | June 4, 1957 |
| 2,806,205 | Donath | Sept. 10, 1957 |
| 2,904,682 | Rawlins | Sept. 15, 1959 |
| 2,909,606 | Wennemer | Oct. 20, 1959 |
| 3,001,177 | Adler | Sept. 19, 1961 |